(12) United States Patent
Azimi-Sadjadi et al.

(10) Patent No.: US 8,478,319 B2
(45) Date of Patent: Jul. 2, 2013

(54) FEATURE EXTRACTION AND DATA COMPRESSION SYSTEM AND METHOD FOR DISTRIBUTED SENSOR NETWORKS

(75) Inventors: Mahmood R. Azimi-Sadjadi, Fort Collins, CO (US); SaravanaKumar Srinivasan, Fort Collins, CO (US); Michael V. McCarron, Livermore, CO (US)

(73) Assignee: Information System Technologies, Inc., Fort Collins, CO (US)

( * ) Notice: Subject to any disclaimer, the term of this patent is extended or adjusted under 35 U.S.C. 154(b) by 500 days.

(21) Appl. No.: 12/778,206

(22) Filed: May 12, 2010

(65) Prior Publication Data

US 2011/0281602 A1 Nov. 17, 2011

(51) Int. Cl.
*H04B 17/00* (2006.01)
*H04W 24/00* (2009.01)
*G08B 1/08* (2006.01)
*G08B 23/00* (2006.01)
*G01S 3/80* (2006.01)
*H04J 11/00* (2006.01)
*H04L 27/28* (2006.01)
*H04L 27/06* (2006.01)
*G06F 15/16* (2006.01)

(52) U.S. Cl.
USPC ............. 455/507; 455/67.11; 455/456.1; 340/539.19; 340/539.22; 340/573.1; 367/124; 367/127; 367/128; 370/208; 370/210; 375/260; 375/341; 709/229

(58) Field of Classification Search
USPC ............. 455/7, 9, 11.1, 18, 41.2, 66.1, 67.11, 455/88, 403, 405, 422, 446, 449, 450, 456.1, 455/456.3, 466, 507, 517, 550, 561; 340/10.1, 340/505, 521, 531, 539.01, 539.17, 539.19, 539.22, 541, 545.4, 545.5, 550, 552, 573.1; 367/118, 124, 127, 128, 129, 135, 136; 370/41.2, 310.1, 312, 315, 319, 320, 321, 370/328, 335, 338, 343, 346, 390; 379/265.01; 709/203, 216, 217, 219, 223, 224, 228, 229, 709/232, 247
See application file for complete search history.

(56) References Cited

U.S. PATENT DOCUMENTS 4,001,771 A 1/1977 Amrine et al.
4,041,442 A 8/1977 Marquardt
(Continued)

OTHER PUBLICATIONS

Personal Author: Azimi-Sadjadi, Corporate Author: Information Systems Technologies, Inc., Title: A Joint Feature Extraction & Data Compression Method for Low Bit Rate Transmission in Distributed Acoustic Sensor Environments., Publisher: DTIC online [Acession No. ADA430254].

*Primary Examiner* — Andrew Wendell
*Assistant Examiner* — Paul P Tran
(74) *Attorney, Agent, or Firm* — Ancel W. Lewis, Jr.

(57) ABSTRACT

A distributed sensor network has a base station and clusters of sensor nodes. In a method of locating and classifying signal sources, at each node divides a received signal into blocks, performs Fourier-based transform on the blocks, selects peaks from the transformed blocks, selects subbands with features of interest based on the frequency of occurrence of the peaks across the blocks, collaborates with other nodes in the cluster to make a final selection of the subbands, encodes the subband features of the signal, and transmits the subband features to the base station. The base station processes the received subband features to locate and classify the signal sources.

17 Claims, 3 Drawing Sheets

U.S. PATENT DOCUMENTS

| | | | |
|---|---|---|---|
| 4,730,282 | A | 3/1988 | Jaeger et al. |
| 4,811,308 | A | 3/1989 | Michel |
| 5,703,835 | A | 12/1997 | Sharkey et al. |
| 5,798,983 | A | 8/1998 | Kuhn et al. |
| 5,973,998 | A | 10/1999 | Showen et al. |
| 6,178,141 | B1 | 1/2001 | Duckworth et al. |
| 6,208,247 | B1 | 3/2001 | Ague et al. |
| 6,466,138 | B1* | 10/2002 | Partyka .................... 340/870.11 |
| 6,757,344 | B2* | 6/2004 | Carleton ........................ 375/341 |
| 6,847,587 | B2 | 1/2005 | Patterson et al. |
| 6,987,482 | B2 | 1/2006 | Sander |
| 7,005,981 | B1 | 2/2006 | Wade |
| 7,034,716 | B2 | 4/2006 | Succi et al. |
| 7,271,747 | B2 | 9/2007 | Baranuik et al. |
| 7,433,266 | B2 | 10/2008 | Ledeczi et al. |
| 7,616,526 | B2 | 11/2009 | Szajnowski |
| 2003/0067889 | A1* | 4/2003 | Petite ............................ 370/310 |
| 2004/0100868 | A1* | 5/2004 | Patterson et al. ............. 367/127 |
| 2005/0031048 | A1* | 2/2005 | Koga et al. .................... 375/260 |
| 2005/0117454 | A1 | 6/2005 | Millikin |
| 2006/0146648 | A1 | 7/2006 | Ukita |
| 2006/0241916 | A1 | 10/2006 | Sieracki |
| 2007/0140570 | A1* | 6/2007 | Curry ............................ 382/232 |
| 2007/0159924 | A1 | 7/2007 | Vook et al. |
| 2008/0069334 | A1 | 3/2008 | Denby et al. |
| 2008/0143512 | A1* | 6/2008 | Wakisaka et al. ............. 340/504 |
| 2008/0165621 | A1 | 7/2008 | Fisher et al. |
| 2008/0219100 | A1 | 9/2008 | Fisher et al. |
| 2009/0122650 | A1 | 5/2009 | Calhoun |
| 2010/0097923 | A1* | 4/2010 | Zhao et al. .................... 370/210 |
| 2011/0098005 | A1* | 4/2011 | Selen et al. ................. 455/67.11 |

\* cited by examiner

FEATURE EXTRACTION AND DATA COMPRESSION SYSTEM AND METHOD FOR DISTRIBUTED SENSOR NETWORKS

TECHNICAL FIELD

The present invention relates to sensor networks, and more particularly to a distributed sensor network and a method for feature extraction and data reduction at the sensor nodes with specific application to determining ground and airborne vehicle locations.

BACKGROUND ART

Distributed wireless sensor networks consisting of several single sensors offer important benefits for a multitude of applications including battlefield surveillance, situation awareness and monitoring, urban warfare, homeland security and border control. Distributed wireless sensor networks can be used to capture acoustic signatures of a wide variety of sources including ground and airborne vehicles as well as transient events such as gunshots. Among the benefits of distributed wireless sensor networks are: simplicity and ease of deployment, stealthy operation in urban areas, large coverage area, good spatial resolution for separating multiple closely spaced sources, low hardware complexity and hence low costs, and flexibility in configuring different dynamic sensor array configurations.

Reducing the rate of data transmission from each sensor node to the base station not only reduces the cost and power consumption of each sensor node but also the complexity and cost of the base station. More importantly, it allows deploying a large number of sensor nodes to cover a large area without exceeding the bandwidth limitation of the wireless communication system. For example, in a system that uses zigbee-based communication protocols with sensor nodes based on the IEEE 802.15.4 standard, the data rate or bandwidth is 250 kilo bits per second (kbps) per channel. If each sensor node transmits 25 kbps, only 10 sensor nodes can communicate simultaneously to a base station. If each sensor node transmits 2 kbps, 125 sensor nodes can communicate simultaneously to a base station.

A system with sensor-level detection, feature extraction and data compression for low bit rate transmission of essential target attributes to the base station can significantly reduce the data rate relative to prior known systems. In moderately large sensor networks with sensor nodes that use communication protocols such as zigbee-based communication protocols that use the, data rates of less than 2 kbps per node are needed to meet the bandwidth limitations, while guaranteeing the usefulness of the data for accurately locating moving sources. Such a system can make practical the widespread use of low cost distributed wireless sensor nodes in many applications.

U.S. Pat. No. 7,005,981 to Wade discloses a system and method with sensor systems or nodes with the steps of pre-processing collected data, and applying a matched extraction/compression scheme to the pre-processed data. U.S. Patent Application Publication No. 2008/0069334 to Denby et al. discloses a system and method with a central server and agents with the steps of applying a statistical test to measurement data, and based on the results of the statistical test, determining whether an update needs to be sent from the agent to the server.

DISCLOSURE OF THE INVENTION

A distributed sensor network for locating and classifying signal sources includes a base station and clusters of sensor nodes. Each sensor node has one or more sensors, memory, a field programmable gate array (FPGA) or other processing device, and a communications link with the base station and other nodes in the same cluster. A method of feature extraction and data reduction of an analog signal received by a sensor node in a cluster in the sensor network includes the steps of converting the analog signal into a digital signal, storing a selected time increment, such as one second, of the signal, dividing the signal for the time increment into blocks, performing a transform on each block, selecting peaks from each transformed block, selecting subbands based on the frequency of occurrence of the peaks in the transformed blocks, collaborating with the other sensor nodes in the cluster to select the common subbands, performing a transform on the signal for the time increment, encoding the subband features of the signal for the time increment, and transmitting the subband features of the signal for the time increment to the base station. The method is implemented through software instructions in the processing device, and the elements of the sensor node are a means for performing each of the steps of the method.

BRIEF DESCRIPTION OF THE DRAWINGS

Details of this invention are described in connection with the accompanying drawings that bear similar reference numerals in which.

DETAILED DESCRIPTION OF THE INVENTION

Figure 1:
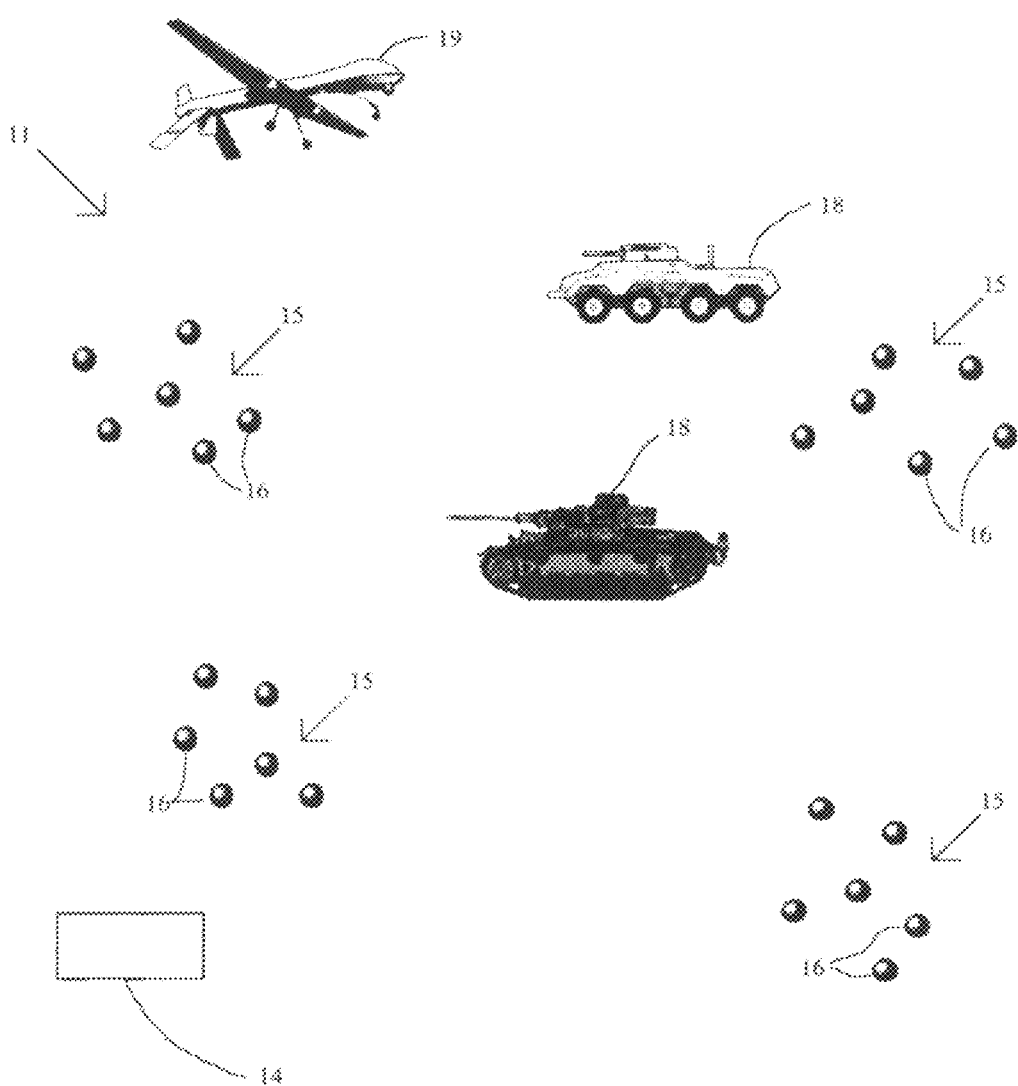
FIG. 1 is a pictorial top plan view of a distributed sensor network embodying features of the present invention.

Referring now to FIG. 1, a distributed sensor network 11 embodying features of the present invention includes a base station 14, and spaced clusters 15 each having a plurality of spaced sensor nodes 16. The network 11 finds the direction of arrival (DOA), locates, and classifies the acoustic sources including ground vehicles 18 and airborne vehicle 19.

Figure 2:
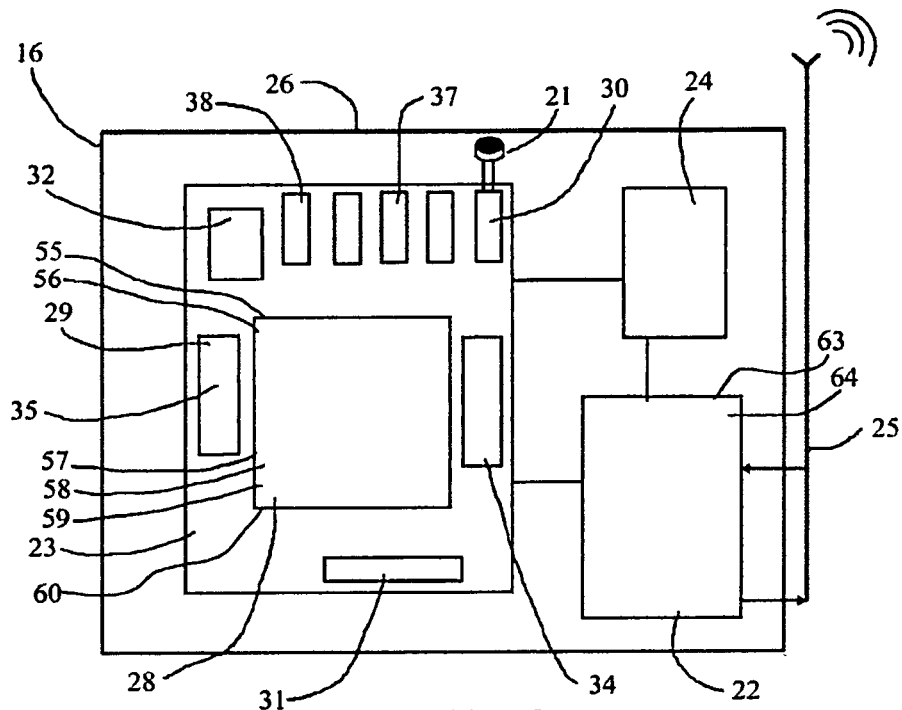
FIG. 2 is a block diagram of a sensor node of the network of FIG. 1.

In the illustrated embodiment, the sensor nodes 16 detect acoustic signals. By way of example, and not as a limitation, sensors that detect magnetic, seismic, chemical, and/or photonic signals can also be used. FIG. 2 shows a sensor node 16 having an acoustic sensor or microphone 21, a wireless transceiver or mote 22, a sensor board 23, a battery pack 24, an external antenna 25 and an enclosure box 26. The Telos-B, MICAz and MICA2 motes by Crossbow Technology Inc. are examples of suitable motes 22 that are currently available.

The mote 22 connects to the sensor board 23 and provides a wireless communication link with the base station 14 and with the other sensor nodes 16 in the cluster 15. The mote 22 at the sensor node 16 receives time synchronization beacons from the base station 14, wirelessly communicates with other sensor nodes 16 in cluster 15 for collaboration of subband information, and transmits compressed data to the base station 14. In addition, the mote 22 also provides the ability to configure the sensor node 16 and to handle commands from the base station 14. Although the base station 14 and sensor nodes 16 use wireless communication links in the illustrated embodiment, wired communication links can also be used.

The sensor board 23 includes an FPGA 28, memory 29, a plurality of analog channels 30, a header 31 and a single chip transceiver 32. The memory 29 includes pseudo-SRAM 34 and flash memory 35. The PSRAM 34 can be used as a buffer for sensor data or as temporary storage for intermediate variables. Five channels 30 are shown. Four of these channels 30 have 12 bit A/D converters 37. The fifth channel 30 has a 16 bit A/D converter 38, and is used primarily for vehicle tracking. The header 31 shown has one Joint Test Action Group (JTAG) connector which can be used to program the FPGA 28, and three 8-bit expansion headers which can be used to connect to external components such as a digital compass, GPS etc. The Chipcon CC100 by Texas Instruments Inc. is an example of a suitable, currently available single chip transceiver 32. The single chip transceiver 32 is a high frequency radio that can be used for node self-location.

Figure 3:
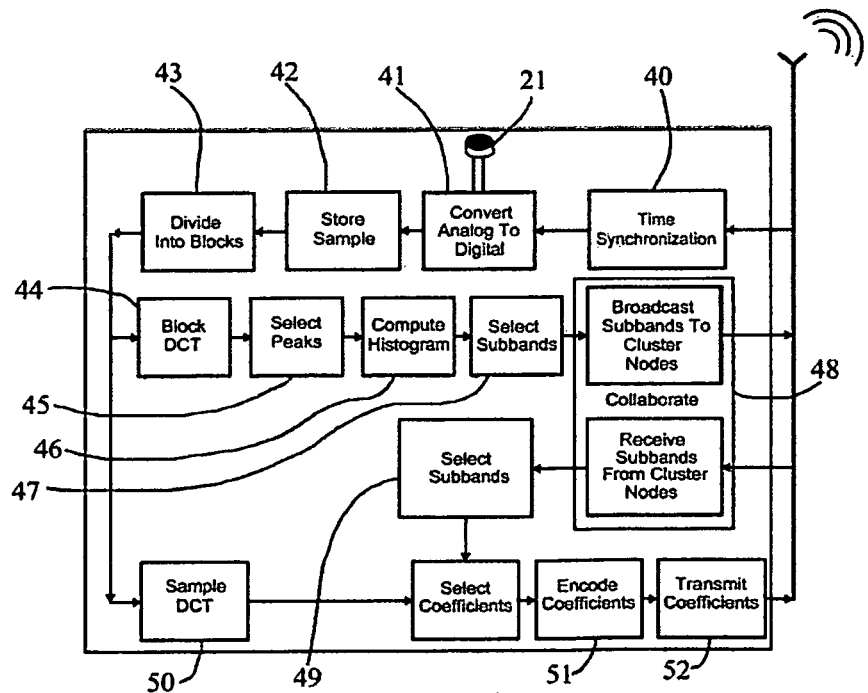
FIG. 3 is a block diagram of a sensor node method for the network of FIG. 1.

As shown in FIG. 3, a method embodying features of the present invention including the following steps. Synchronizing 40 the time at the sensor nodes 16 starts with a time synchronization beacon that is broadcasted by the base station 14 every selected time increment of one second. Other time increments may also be selected. The mote 22 of the sensor node 16 receives the time synchronization beacon and triggers the sampling of the acoustic signal received by the microphone 21. Since all sensor nodes 16 will receive the time synchronization beacon at virtually the same time, sampling is triggered at approximately the same time at all sensor nodes 16. Converting 41 the synchronously sampled analog signal into a digital signal is then performed by the A/D converter 37. In the illustrated embodiment the A/D converter 37 samples at a rate 1024 Hz with a resolution of 12 bits which is found to be sufficient for the vehicle localization application.

For each selected time increment of one second, storing 42 the digital signal is next. The first 876 samples of the 1024 samples are stored. The next step is dividing 43 the stored samples into blocks of 128 samples with an overlap of 64 samples, resulting in thirteen blocks. Each block is padded with a mean value such that each block includes 1024 samples. The 12 bit A/D converter 37 has a dynamic data range of 0 to 4095, and 2047 is chosen as the mean value for padding.

Performing 44 a 1024-point Discrete Cosine Transform (DCT) on each block after padding is the next step. The 1024 output DCT coefficients, each 32 bit, are stored in a separate buffer. Other Fourier-based transforms can also be used instead of the DCT. The DCT, the Short Time Fourier Transform (STFT), and the Modified DCT (MDCT) were implemented and benchmarked. The DCT-based method provided the best overall performance amongst the methods tried. The transform converts the signal for each block from the time domain to the frequency domain.

The range of the 5th to the 512th coefficients corresponds to the range of 2 Hz to 256 Hz in the frequency spectrum. The following step is selecting 45 five peaks from this range for each block. Other numbers of peaks could also be selected. The peak finding process uses a sliding window. In the illustrated embodiment, the window size is eleven. Other window sizes can be used. If the center coefficient in the sliding window is the maximum coefficient in the window and above a selected threshold, then the corresponding frequency index is recorded as a peak. The sliding window is moved by one coefficient and the comparison process is repeated. One method that can be used to select the threshold is finding the median value of the coefficients inside the sliding window and then using a percentage, for example 120%, of the median as the local threshold. After sliding through the specified range of frequencies, if more than five peaks are detected, then only the peaks corresponding to the five highest DCT coefficient values are retained.

The next step is computing 46 a histogram of the peaks selected from all of the blocks. In the illustrated embodiment, the bin width corresponds to a frequency range of 17 Hz. Selecting 47 three subbands, corresponding to the bins with the highest number of occurrences of peaks, follows computing 46 a histogram. These subbands include the most persistent components, and computing the histogram identifies subbands that carry target information.

After selecting 47 the subbands at the sensor node 16, collaborating 48 with the other nodes 16 in the cluster 15 is performed to select the most commonly occurring subbands. Collaborating 48 involves each sensor node 16 broadcasting wirelessly in a round robin fashion that sensor node's 16 three subbands, and receiving the subbands from all the other sensor nodes 16 in the cluster 15. After collaborating 48, each sensor node 16 computes a histogram of the subbands, selecting 49 the three common subbands that occurred consistently across the sensor nodes 16 in cluster 15.

After selecting 49 the common subbands, the 876 samples stored in the buffer are padded with the mean value to provide 1024 samples. The next step after padding is performing 50 a 1024-point DCT the samples. Since each bin corresponds to a frequency range of 17 Hz, the coefficients corresponding to each subband include the coefficient for the center of the bin and the 16 coefficients on each side of the center, making a total of 33 coefficients for each subband. Of the 1024 coefficients, a total of 3×33=99 coefficients, or about 10% (10-to-1 reduction), are selected to represent the original signal.

Encoding 51 the 99 selected coefficients is next. The DCT coefficients are encoded based on the radix 10 IEEE-754 standard. Each of the 32 bit DCT coefficients is represented using 16 bits in IEEE 754 format, where one bit is allotted to represent the sign of the coefficient, 4 bits to represent the exponent part and 11 bits to represent the significant part. Assuming that three DCT subbands are selected by the detection scheme, and there are 33 DCT coefficients in each subband, then the effective bit rate required for transmitting the DCT coefficients is 1.54 kbps. Including headers, such as Zigbee wireless data packet headers, the actual bit rate achieved can be approximately 2 kbps. After encoding, the next step is transmitting 52 the coefficients from each sensor node 16 in each cluster 15 to the base station 14 via the mote 22 and antenna 25.

The method exploits the peaky nature of the time-frequency of the acoustic signatures of different types of vehicles. That is, the spectra of the time-windowed signals exhibit disjoint identifiable peaks within some subbands, the features of which may then be encoded and transmitted to the base station 14.

Referring again to FIG. 2, several of the steps of the method are implemented through software instructions executed by the FPGA 28 such that the FPGA 28 is a means for dividing 55 the signal into blocks, a means for performing 56 a first Fourier-based transform on the blocks, a means for selecting 57 a plurality of peaks in each transformed block, a means for selecting 58 a plurality of subbands of the signal based on the frequency of occurrence of the peaks in the transformed blocks, a means for performing 59 a second Fourier-based transform on the entire time increment of the signal and a means for encoding 60 the subbands before transmitting the subbands. These steps can be performed by other processors, and portions of these steps could be implemented through hardware such that other means could be used. The mote 22 is a means for transmitting 63 the subbands of the signal to the base station 14. Other wired or wireless devices could be used. The mote 22 and the FPGA 28 combined provide a means for collaborating 64 with the other sensor nodes 16 in the cluster 15 to select the common subbands, and other means can be used.

Figure 4:
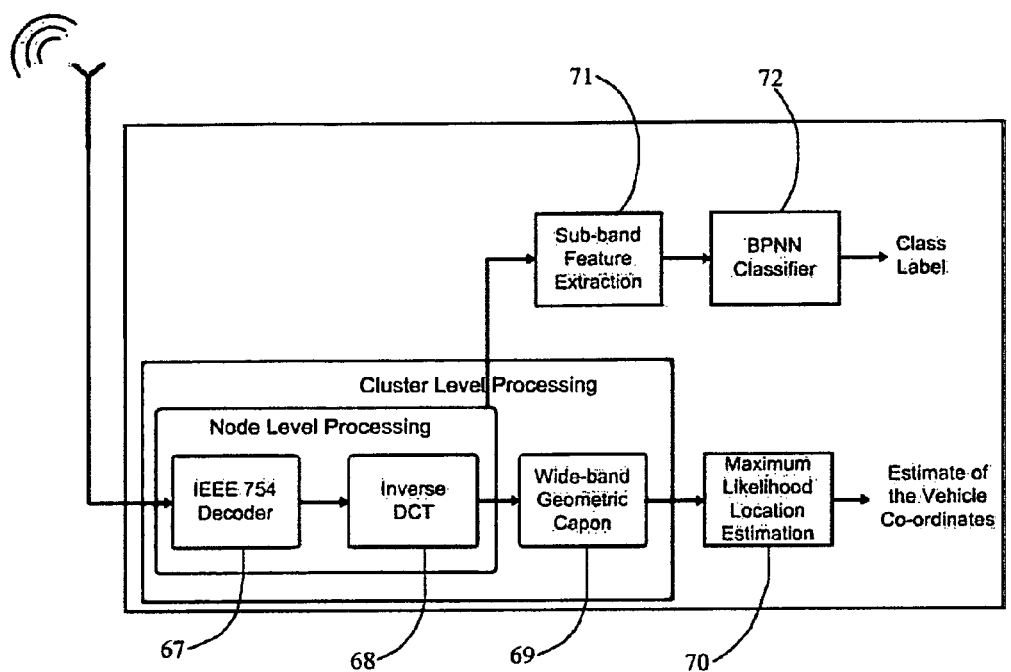
FIG. 4 is a block diagram of a base station method of the network of FIG. 1.

FIG. 4 shows a base station 14 method embodying features of the present invention. The first step is decoding 67 the encoded coefficients received from each sensor node 16 using the IEEE 754 decoder. The next step is performing 68 a 1024-point inverse DCT on the decoded coefficients to recover the signals in the time domain. Applying 69, at the base station 14, a wideband geometric averaging Capon method to all the recovered time domain signals of each sensor node 16 within the cluster 15 to estimate the DoA of moving signal sources is the next step. (see M. R. Azimi-Sadjadi, N. Roseveare, and A. Pezeshki, "Wideband DoA Estimation Algorithms for Multiple Moving Sources using Unattended Acoustic Sensors", IEEE Trans. on Aerospace and Electronic Systems, vol. 44, pp. 1585-1599, October 2008)

The next step is applying 70 a Maximum Likelihood-based method to triangulate and locate the vehicle using the DoA estimates of the moving vehicles obtained from each of the clusters 15. A Maximum Likelihood-based method that offers robustness to erroneous DoA estimates is developed to estimate the locations at every one second time segment. Successive location results are then used to form the path of the vehicle.

Other steps include extracting 71 subband features and then classifying 72 the signal sources, such as vehicles, at the base station 14 through the use of the extracted subband features. The occurrences and significance of the subbands over an observation period are representative of the frequency harmonics of the sources as well as the sources' transient behavior as the sources maneuver in the field. The occurrences of the selected DCT subband peaks in several one second snapshots can be used for vehicle classification. The center frequencies of the subbands are accumulated over a period of ten seconds in order to gather enough clues for accurate classification. For ground vehicles there are four possible classes of vehicles, namely: light-wheeled, heavy-wheeled, light-tracked and heavy-tracked. The window length of 10 seconds appears to be optimum as the decision about the class membership cannot be made in smaller size windows and enough clues need to be gathered before final decision making. Any classifier such as a back-propagation neural network (BPNN) can be used to classify the vehicles based on the extracted features.

Although the present invention has been described with a certain degree of particularity, it is understood that the present disclosure has been made by way of example and that changes in details of structure may be made without departing from the spirit thereof.

What is claimed is:

1. A distributed sensor network for locating and classifying signal sources comprising:
a base station, and
at least one cluster having a plurality of sensor nodes with each sensor node including:
a sensor,
means, connected to receive a signal from said sensor, for dividing a selected time increment of said signal into blocks of time increments of said signal that are smaller than said selected time increment,
means for performing a first Fourier-based transform on each said block,
means for selecting a plurality of frequency peaks for each said block,
means for selecting a plurality of subbands of said signal based on the frequency of occurrence of said frequency peaks of said blocks,
means for collaborating with other sensor nodes in said cluster to select a plurality of common subbands from subbands selected by said nodes in said cluster,
means for performing a second Fourier-based transform on said selected time increment of said signal, and
means for transmitting said common subbands of said selected time increment of said signal to said base station,
whereby said common subbands include features relevant to a source of said signal and said base station locates and classifies said source by processing said common subbands received from said sensor nodes.

2. The network as set forth in claim 1 wherein said means for transmitting and said means for collaborating together include at least one wireless transceiver device.

3. The network as set forth in claim 1 wherein said sensor nodes each include an analog to digital converter for converting said signal into a digital signal.

4. The network as set forth in claim 1 wherein said first and second Fourier-based transforms are Discrete Cosine Transforms.

5. The network as set forth in claim 1 wherein each sensor node includes a means for encoding said common subbands before transmitting said common subbands.

6. The network as set forth in claim 1 wherein each sensor node includes a field programmable gate array and memory.

7. The network as set forth in claim 6 wherein said means for selecting a plurality of frequency peaks and said means for selecting a plurality of subbands include software instructions implemented in said field programmable gate array.

8. A distributed sensor network for locating and classifying signal sources comprising:
a base station, and
at least one cluster having a plurality of sensor nodes with each sensor node including:
a sensor for receiving a signal,
an analog to digital converter for converting said signal into a digital signal,
a field programmable gate array connected to said analog to digital converter, and programmed to divide a selected time increment of said digital signal into blocks of time increments of said signal that are smaller than said selected time increment, perform a first Discrete Cosine Transform on each said block, select a plurality of frequency peaks for each said block, select a plurality of subbands of said signal based on the frequency of occurrence of said frequency peaks in said blocks, perform a second Discrete Cosine Transform on said selected time increment of said digital signal, and
a wireless transceiver for collaborating, in cooperation with said field programmable gate array, with other sensor nodes in said cluster to select a plurality of common subbands from subbands selected by said nodes, and for transmitting said common subbands of said digital signal to said base station,
whereby said common subbands include features relevant to a source of said signal and said base station locates and classifies said source by processing said common subbands received from said sensor nodes.

9. A method of feature extraction and data reduction of a signal received by a sensor node in a cluster of sensor nodes in a sensor network with said sensor network including a base station, comprising the steps of:

dividing a selected time increment of said signal into blocks of time increments of said signal that are smaller than said selected time increment, performing a first Fourier-based transform on each said block, selecting a plurality of frequency peaks for each said block, selecting a plurality of subbands of said signal based on the frequency of occurrence of said frequency peaks in said blocks, collaborating with other sensor nodes in said cluster to select a plurality of common subbands from subbands selected by said nodes in said cluster, after said step of selecting a plurality of subbands, performing a second Fourier-based transform on said selected time increment of said signal, and transmitting said common subbands of said signal for said time increment to said base station, whereby said common subbands include features relevant to a source of said signal and said common subbands reduce data relative to said signal for said selected time increment.

10. The method as set forth in claim 9 including the step of converting said signal for said selected time increment to a digital signal before said step of dividing.

11. The method as set forth in claim 9 wherein said first and second Fourier-based transforms are Discrete Cosine Transforms.

12. The method as set forth in claim 9 wherein said subbands include about ten percent of said signal for said selected time increment.

13. The method as set forth in claim 9 wherein in said step of selecting a plurality of frequency peaks, five frequency peaks are selected in each block.

14. The method as set forth in claim 9 wherein said step of selecting a plurality of subbands includes computing a histogram of said frequency peaks.

15. The method as set forth in claim 9 wherein in said step of selecting a plurality of subbands, three subbands are selected.

16. The method as set forth in claim 9 including the step of encoding said common subbands of said signal for said selected time increment before transmitting said common subbands of said signal for said selected time increment to said base station.

17. A method of feature extraction and data reduction of a signal received by a sensor node in a cluster of sensor nodes in a sensor network with said sensor network including a base station, comprising the steps of:

dividing a selected time increment of said signal into blocks of time increments of said signal that are smaller than said selected time increment, performing a first Discrete Cosine Transform on each said block, selecting five frequency peaks for each said block, computing a histogram of said frequency peaks, selecting three subbands of said signal based on the frequency of occurrence of said frequency peaks in said blocks, collaborating with other sensor nodes in said cluster to select three of common subbands, performing a second Discrete Cosine Transform on said selected time increment of said signal, encoding said common subbands of said signal for said selected time increment, and transmitting said common subbands of said signal for said selected time increment to said base station, whereby said common subbands include features relevant to a source of said signal and said common subbands reduce data relative to said signal for said selected time increment.

\* \* \* \* \*